(12) United States Patent
Husband et al.

(10) Patent No.: US 11,499,566 B2
(45) Date of Patent: Nov. 15, 2022

(54) FAN BLADE HAVING CLOSED METAL SHEATH

(71) Applicant: RAYTHEON TECHNOLOGIES CORPORATION, Farmington, CT (US)

(72) Inventors: Jason Husband, South Glastonbury, CT (US); James Glaspey, Farmington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/196,359

(22) Filed: Mar. 9, 2021

(65) Prior Publication Data
US 2021/0199124 A1 Jul. 1, 2021

Related U.S. Application Data

(62) Division of application No. 16/117,500, filed on Aug. 30, 2018, now Pat. No. 11,009,036.

(51) Int. Cl.
*F04D 29/38* (2006.01)
*F01D 5/14* (2006.01)
(Continued)

(52) U.S. Cl.
CPC ........... *F04D 29/388* (2013.01); *F01D 5/147* (2013.01); *F01D 5/18* (2013.01); *F04D 19/002* (2013.01);
(Continued)

(58) Field of Classification Search
CPC .... F04D 29/388; F04D 19/002; F04D 29/324; F04D 29/644; F04D 29/023; F01D 5/147; F01D 5/18; F01D 5/14; F01D 5/16; F01D 5/12; F01D 5/26; F01D 5/28; F01D 5/189; F01D 25/06; F01D 5/02; F01D 11/008; F01D 5/282; F01D 5/188; F05D 2220/323; F05D 2220/36; F05D 2230/232; F05D 2240/24; F05D 2300/133; F05D 2300/171; F05D 2300/174; F05D 2300/603;
(Continued)

(56) References Cited

U.S. PATENT DOCUMENTS

5,129,787 A 7/1992 Violette et al.
5,403,153 A 4/1995 Goetze
(Continued)

*Primary Examiner* — Eric J Zamora Alvarez
(74) *Attorney, Agent, or Firm* — Carlson, Gaskey & Olds, P.C.

(57) ABSTRACT

A method for forming a blade for a gas turbine engine may include forming a suction side sheath and a pressure side sheath, a first cavity and a second cavity established on opposed sides of a rib, forming a structural core configured for positioning in an interior section of the blade between the suction side sheath and the pressure side sheath, the structural core including a first core member, a second core member and a root interconnecting the first and second core members, assembling the suction side sheath and the pressure side sheath with the structural core such that the first core member is positioned in the first cavity and such that the second core member is positioned in the second cavity, and securing the suction side sheath to the pressure side sheath to form the blade.

20 Claims, 7 Drawing Sheets

(51) Int. Cl.
*F01D 5/18* (2006.01)
*F04D 19/00* (2006.01)
*F04D 29/32* (2006.01)
*F04D 29/64* (2006.01)
*F04D 29/02* (2006.01)
*F01D 5/12* (2006.01)
*B23P 15/04* (2006.01)

(52) U.S. Cl.
CPC ......... *F04D 29/324* (2013.01); *F04D 29/644* (2013.01); *F04D 29/023* (2013.01); *F05D 2220/323* (2013.01); *F05D 2220/36* (2013.01); *F05D 2230/232* (2013.01); *F05D 2240/24* (2013.01); *F05D 2300/133* (2013.01); *F05D 2300/171* (2013.01); *F05D 2300/174* (2013.01); *F05D 2300/603* (2013.01)

(58) Field of Classification Search
CPC ........... F05D 2230/23; F05D 2300/612; F05D 2260/96; F05D 2240/30; B23P 15/04
See application file for complete search history.

(56) References Cited

U.S. PATENT DOCUMENTS

| | | | |
|---|---|---|---|
| 7,189,064 B2 * | 3/2007 | Helder | B23K 20/122 |
| | | | 416/232 |
| 7,753,653 B2 | 7/2010 | Cairo et al. | |
| 8,777,577 B2 | 7/2014 | Schreiber | |
| 8,814,527 B2 | 8/2014 | Huth | |
| 8,858,182 B2 | 10/2014 | Schwarz et al. | |
| 9,126,361 B2 | 9/2015 | Schreiber | |
| 9,376,917 B2 | 6/2016 | Murooka et al. | |
| 9,657,577 B2 | 5/2017 | Weisse | |
| 9,995,152 B2 | 6/2018 | McComb | |
| 2013/0039774 A1 * | 2/2013 | Viens | F04D 29/388 |
| | | | 416/233 |
| 2016/0305443 A1 | 10/2016 | Schwarz | |
| 2016/0333710 A1 * | 11/2016 | Klinetob | F01D 5/26 |

* cited by examiner

FAN BLADE HAVING CLOSED METAL SHEATH

CROSS-REFERENCE TO RELATED APPLICATIONS

This application is a divisional of U.S. application Ser. No. 16/117,500 filed Aug. 30, 2018.

FIELD

The present disclosure relates generally to gas turbine engines and, more particularly, to fan and compressor blades used with gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and fan sections.

A gas turbine engine should be capable of ingesting foreign objects (e.g., birds in flight) while allowing for continued operation or safe and orderly shutdown of the engine. Further, blades in the gas turbine engine should be resistant to cracking due to nicks or dents caused by small debris such as sand or rain. To prevent damage on account of such small debris or foreign object ingestion and to meet such damage-prevention criteria, materials such as titanium alloys and fiber composites may be used to construct the fan or compressor blades.

SUMMARY

A blade for use in a gas turbine engine is disclosed. In various embodiments, the blade includes a pressure side sheath and a suction side sheath secured to the pressure side sheath. The pressure side sheath and the suction side sheath are configured to form a continuous sheath that wraps around an interior section of the blade.

In various embodiments, the pressure side sheath includes a leading edge portion and a trailing edge portion and the suction side sheath is configured to mate against the leading edge portion and the trailing edge portion. In various embodiments, the leading edge portion includes a first pressure side sheath edge and the trailing edge portion includes a second pressure side sheath edge. In various embodiments, the suction side sheath includes a first suction side sheath edge configured to mate with the first pressure side sheath edge and a second suction side sheath edge configured to mate with the second pressure side sheath edge.

In various embodiments, the first suction side sheath edge extends from a suction side base of the suction side sheath to a suction side tip of the suction side sheath and the first pressure side sheath edge extends from a pressure side base of the pressure side sheath to a pressure side tip of the pressure side sheath. In various embodiments, the second suction side sheath edge extends from the suction side base of the suction side sheath to the suction side tip of the suction side sheath and the second pressure side sheath edge extends from the pressure side base of the pressure side sheath to the pressure side tip of the pressure side sheath.

In various embodiments, a central rib extends spanwise along at least one of the suction side sheath and the pressure side sheath. In various embodiments, the pressure side sheath includes a leading edge portion and a trailing edge portion and a first cavity is positioned between the leading edge portion and the central rib and a second cavity is positioned between the trailing edge portion and the central rib. In various embodiments, a structural core has a first core member configured for positioning within the first cavity and a second core member configured for positioning within the second cavity. In various embodiments, the structural core includes a root configured for attachment to a rotor hub or a rotor disk.

A fan blade for a gas turbine engine is disclosed. In various embodiments, the fan blade includes a pressure side sheath having a leading edge portion and a trailing edge portion and a suction side sheath secured to the pressure side sheath, the suction side sheath including a first suction side sheath edge configured to mate with a first pressure side sheath edge and a second suction side sheath edge configured to mate with a second pressure side sheath edge. The pressure side sheath and the suction side sheath are configured to form a continuous sheath that wraps around an interior section of the fan blade.

In various embodiments, the first suction side sheath edge extends from a suction side base of the suction side sheath to a suction side tip of the suction side sheath and the first pressure side sheath edge extends from a pressure side base of the pressure side sheath to a pressure side tip of the pressure side sheath. In various embodiments, the second suction side sheath edge extends from the suction side base of the suction side sheath to the suction side tip of the suction side sheath and the second pressure side sheath edge extends from the pressure side base of the pressure side sheath to the pressure side tip of the pressure side sheath.

In various embodiments, a central rib extends spanwise along at least one of the suction side sheath and the pressure side sheath. In various embodiments, a first cavity is positioned between the leading edge portion and the central rib and a second cavity is positioned between the trailing edge portion and the central rib. In various embodiments, a structural core has a first core member configured for positioning within the first cavity and a second core member configured for positioning within the second cavity. In various embodiments, the structural core includes a root configured for attachment to a rotor.

A method for forming a fan blade for use with a gas turbine engine is disclosed. In various embodiments, the method includes the steps of forming a suction side sheath and a pressure side sheath, the suction side sheath and the pressure side sheath being configured to form a continuous sheath that wraps around an interior section of the fan blade; forming a structural core configured for positioning between the suction side sheath and the pressure side sheath; assembling the suction side sheath and the pressure side sheath with the structural core positioned there between; and securing the suction side sheath to the pressure side sheath to form the fan blade.

In various embodiments, the step of securing the suction side sheath to the pressure side sheath to form the fan blade includes welding the suction side sheath to the pressure side sheath along at least one of a leading edge portion weld, a central portion weld and a trailing edge portion weld. In various embodiments, the structural core includes a first core member configured for positioning within a first cavity, a second core member configured for positioning within a second cavity and a root configured for attachment to a rotor.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
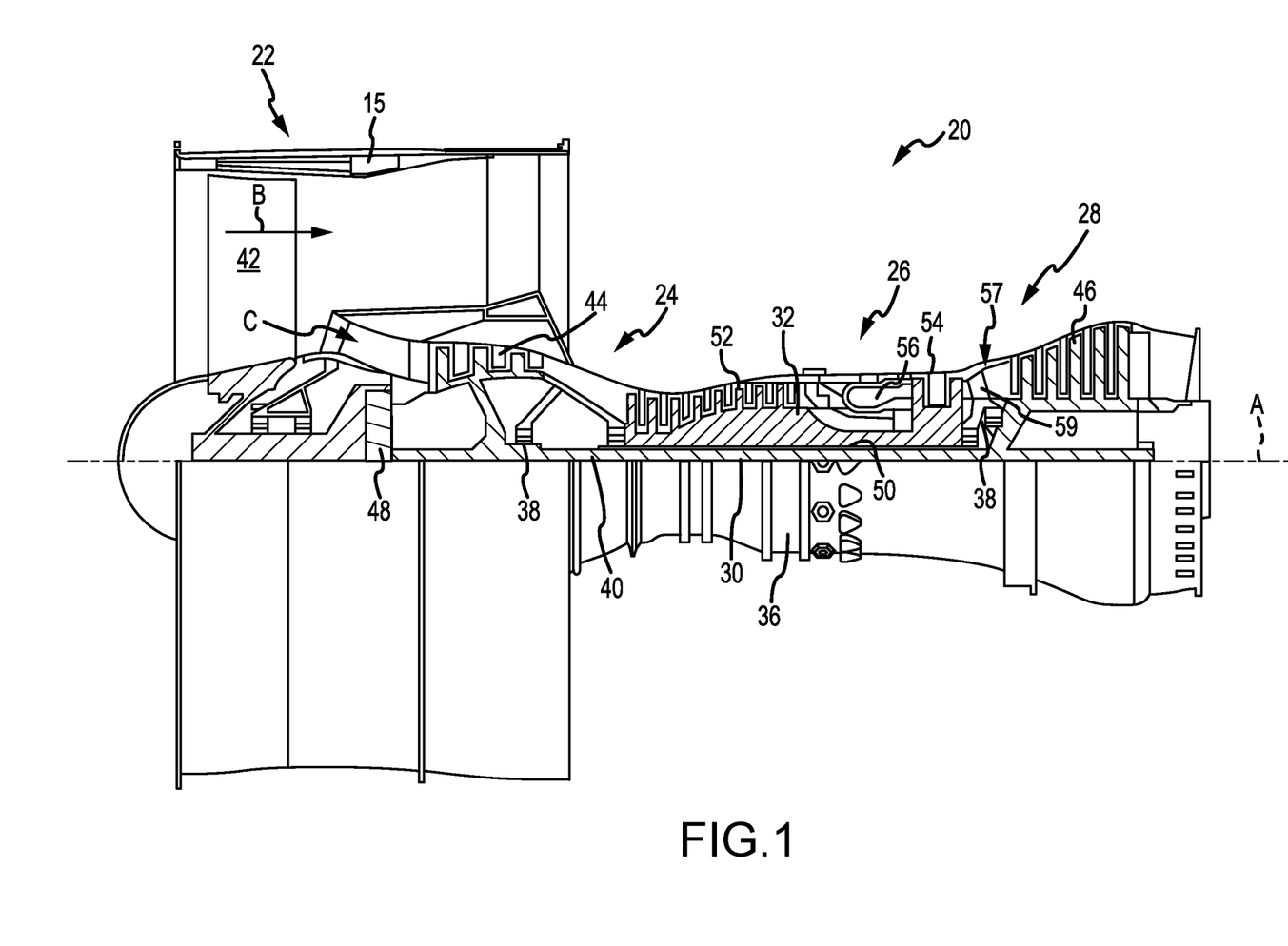
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans, as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2:
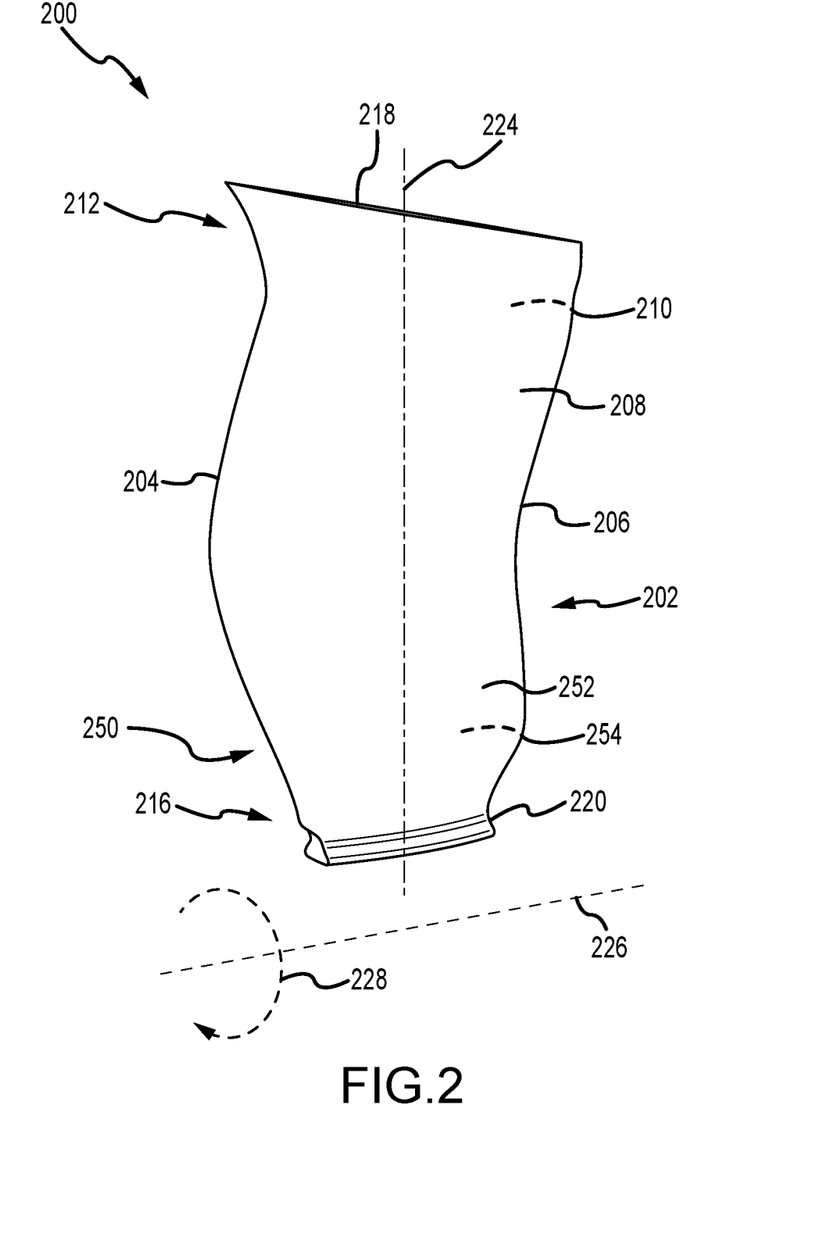
FIG. 2 is a schematic view of a fan blade, in accordance with various embodiments.

Referring now to FIG. 2, a fan blade 200 is illustrated, in accordance with various embodiments. The fan blade 200 is illustrative of one of a plurality of blades of the fan 42 within the fan section 22 described above with reference to FIG. 1. In various embodiments, the fan blade 200 includes an airfoil 202, having a leading edge 204, a trailing edge 206, a suction side 208 that is a generally convex surface, a pressure side 210 that is a generally concave surface, a tip region 212, an intermediate region 214 and a root region 216. In various embodiments, the tip region 212 includes a tip 218 and the root region includes a root 220. A radial axis 224 may extend generally along a spanwise direction from the root 220 to the tip 218 while a longitudinal axis 226 may extend generally in a fore and aft direction and define an axis of rotation about which the fan blade 200 rotates in a circumferential direction 228. In various embodiments, and as described further below, the fan blade 200 includes a sheath 250 that surrounds a core or interior section of the fan blade 200. In various embodiments, the sheath 250 includes a suction side sheath 252 and a pressure side sheath 254.

Figure 3A:
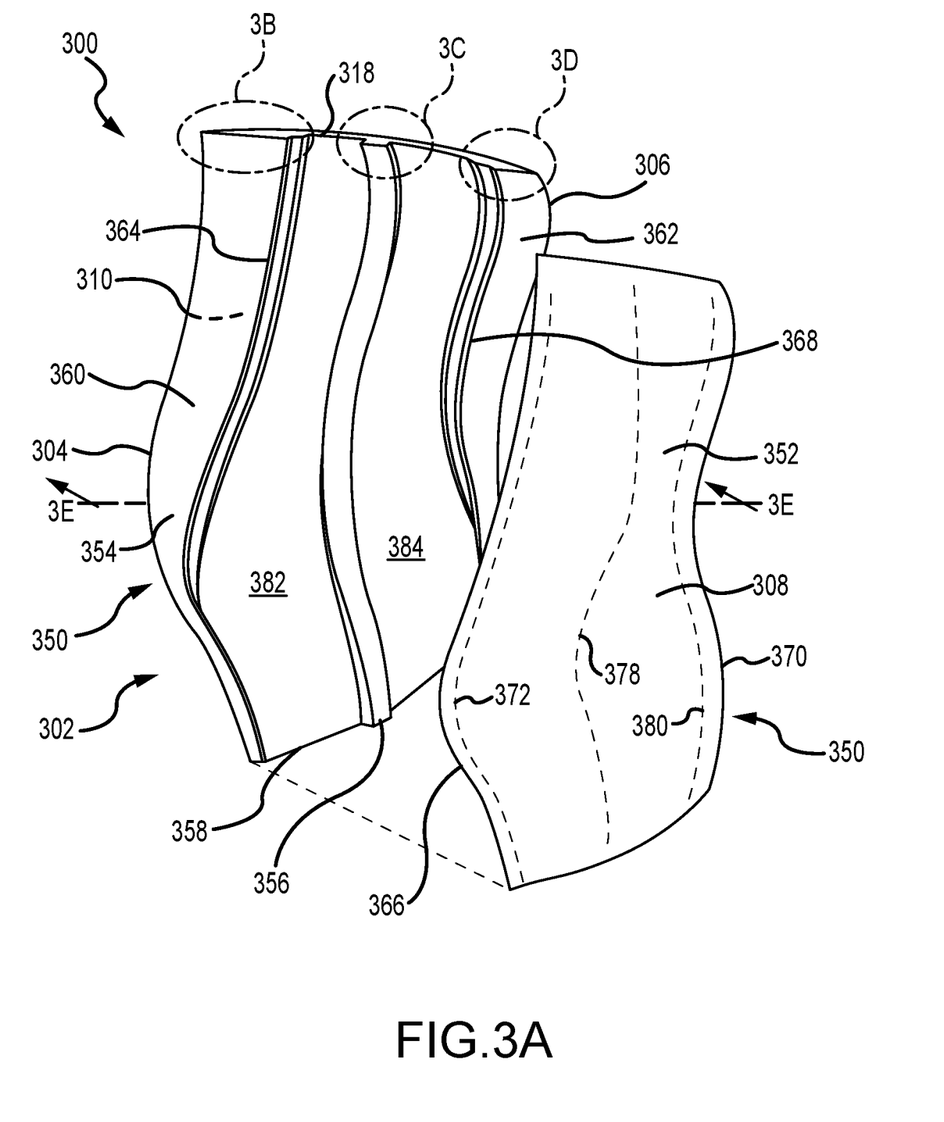
FIGS. 3A, 3B, 3C, 3D and 3E are schematic views of a fan blade, in accordance with various embodiments.

Referring now to FIGS. 3A-3E, a sheath 350 for a fan blade 300, such as, for example, the fan blade 200 described above with reference to FIG. 2, is illustrated in exploded form and various steps used to assemble the sheath 350 are illustrated, in accordance with various embodiments. Referring specifically to FIG. 3A, the sheath 350 includes a suction side sheath 352 and a pressure side sheath 354. When the suction side sheath 352 is connected to or assembled with the pressure side sheath 354, an airfoil 302 corresponding to the fan blade 300 results, such as, for example, the airfoil 202 corresponding to the fan blade 200 described above with reference to FIG. 2. Once assembled, the airfoil 302 that results includes a leading edge 304, a trailing edge 306, a suction side 308 that is a generally convex surface and a pressure side 310 that is a generally concave surface.

In various embodiments, the pressure side sheath 354 includes a central rib 356 that extends spanwise from a base 358 to a tip 318 of the pressure side sheath 354. In various embodiments, the pressure side sheath 354 further includes a leading edge portion 360 and a trailing edge portion 362 that extend spanwise from the base 358 to the tip 318 of the pressure side sheath 354. In various embodiments, the leading edge portion 360 includes a first pressure side sheath edge 364 that is configured to mate with or engage a first suction side sheath edge 366. Similarly, in various embodiments, the trailing edge portion 362 includes a second pressure side sheath edge 368 that is configured to mate with or engage a second suction side sheath edge 370. In various embodiments, the first pressure side sheath edge 364 and the first suction side sheath edge 366 may be configured to mate or engage with each other at the leading edge 304 of the airfoil 302. Similarly, in various embodiments, the second pressure side sheath edge 368 and the second suction side sheath edge 370 may be configured to mate or engage with each other at the trailing edge 306 of the airfoil 302.

In various embodiments, the contour of the first pressure side sheath edge 364 is precisely matched with the contour of the first suction side sheath edge 366 and the contour of the second pressure side sheath edge 368 is precisely matched with the contour of the second suction side sheath edge 370. The precision matching of the corresponding contours permits a smooth external surface of the airfoil 302 that results when the suction side sheath 352 is assembled with the pressure side sheath 354. Further, as described above and below, in various embodiments, the sheath 350, when assembled, forms a continuous sheath that wraps around a core or interior section of the airfoil 302 or the fan blade 300 that results, from the leading edge 304 to the trailing edge 306 on the suction side 308 and from the trailing edge 306 back to the leading edge 304 on the pressure side 310. In various embodiments, the wraparound of the airfoil 302 or the fan blade 300 by the sheath 350 occurs from proximate a root to proximate a tip of the fan blade 300.

Figure 3B:
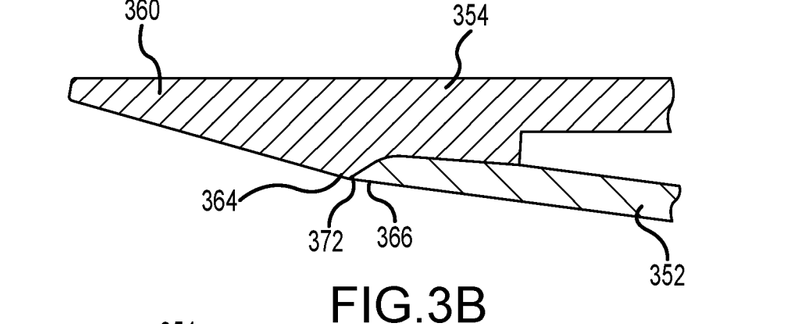
Figure 3C:
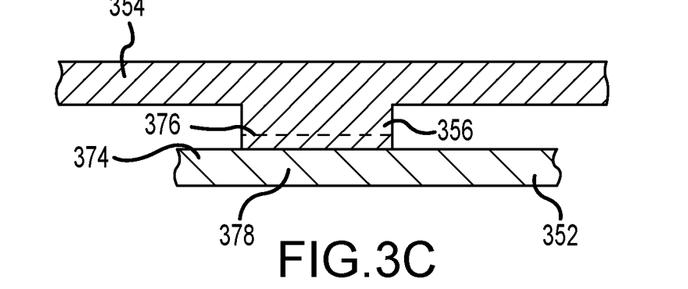
Figure 3D:
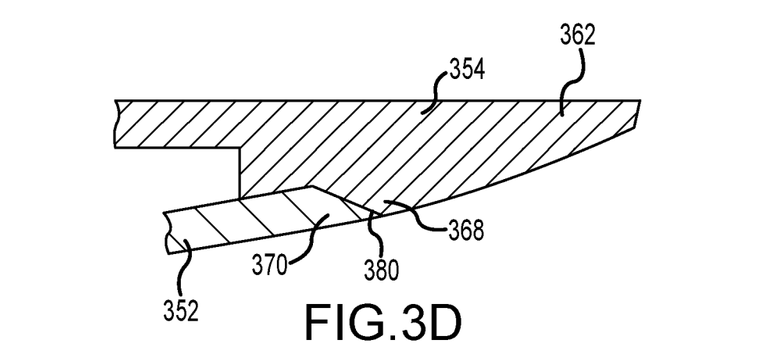

Referring now to FIGS. 3B, 3C and 3D, cross sectional schematic views of the leading edge portion 360, the central rib 356 and the trailing edge portion 362, respectively, are illustrated proximate the tip 318 following assembly of the suction side sheath 352 and the pressure side sheath 354. For example, referring to FIG. 3B, the suction side sheath 352 is illustrated positioned against the pressure side sheath 354 at the leading edge portion 360. More specifically, the first pressure side sheath edge 364 is illustrated as matched and engaged with the first suction side sheath edge 366. In various embodiments, a leading edge portion weld 372 is made and extends along the intersection defined by the mating of the first pressure side sheath edge 364 and the first suction side sheath edge 366 which, in various embodiments, extends from the base 358 to the tip 318, as shown more clearly in FIG. 3A.

Similarly, referring to FIG. 3C, the suction side sheath 352 is illustrated positioned against the pressure side sheath 354 proximate the central rib 356. In various embodiments, an interior surface 374 of the suction side sheath 352 abuts the central rib 356 from the base 358 to the tip 318. Rather than abutting the interior surface 374 as just described, in various embodiments, the suction side sheath 352 may also include a central rib, as indicated by the dashed line 376, such that both central ribs abut one another from the base 358 to the tip 318. In various embodiments, a central portion weld 378 is made and extends along the intersection defined by the mating of the suction side sheath 352 and the central rib 356 which, in various embodiments, extends from the base 358 to the tip 318, as shown more clearly in FIG. 3A.

Referring now to FIG. 3D, and similar to the foregoing, the suction side sheath 352 is illustrated positioned against the pressure side sheath 354 at the trailing edge portion 362. More specifically, the second pressure side sheath edge 368 is illustrated as matched and engaged with the second suction side sheath edge 370. In various embodiments, a trailing edge portion weld 380 is made and extends along the intersection defined by the mating of the second pressure side sheath edge 368 and the second suction side sheath edge 370 which, in various embodiments, extends from the base 358 to the tip 318, as shown more clearly in FIG. 3A. Referring again to each of FIGS. 3A, 3B, 3C and 3D, while single welds are illustrated extending along the leading edge portion weld 372, the central portion weld 378 and the trailing edge portion weld 380, it will be appreciated that each weld portion may comprise a series of welds—e.g., welds that extend substantially parallel to one another—running from the base 358 to the tip 318 or some portion thereof. In various embodiments, the components—e.g., the suction side sheath 352 and the pressure side sheath 354—may be secured together using one or more of welding, laser welding, brazing, soldering and riveting.

Figure 3E:
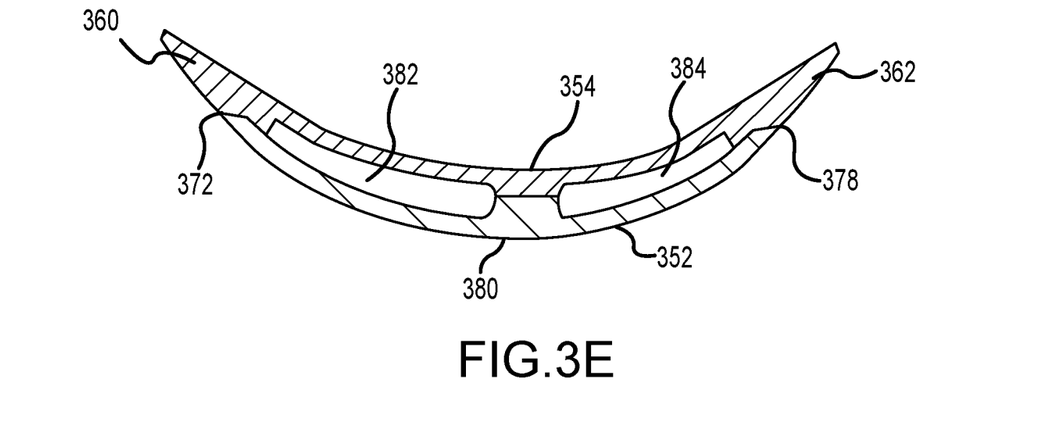

Referring now to FIG. 3E, a cross sectional schematic view of the sheath 350, when assembled, is illustrated. As assembled, the sheath 350 includes the suction side sheath 352 secured to the pressure side sheath 354. In various embodiments, the suction side sheath 352 is secured to the pressure side sheath 354 using welds, such as, for example, the leading edge portion weld 372, the central portion weld 378 and the trailing edge portion weld 380 described above. In various embodiments, the sheath 350 resulting from the above described assembly provides for a first cavity 382 and a second cavity 384. In various embodiments, the first cavity 382 and the second cavity 384 extend from the base 358 to the tip 318. In various embodiments, the first cavity 382 and the second cavity 384 may remain hollow, as illustrated, or contain a structural material such as, for example, a carbon composite based material, as described below. In various embodiments, any number of central ribs may be provided (including embodiments with no central ribs), resulting in a corresponding number of cavities (typically, the number of central ribs plus one).

Figure 4:
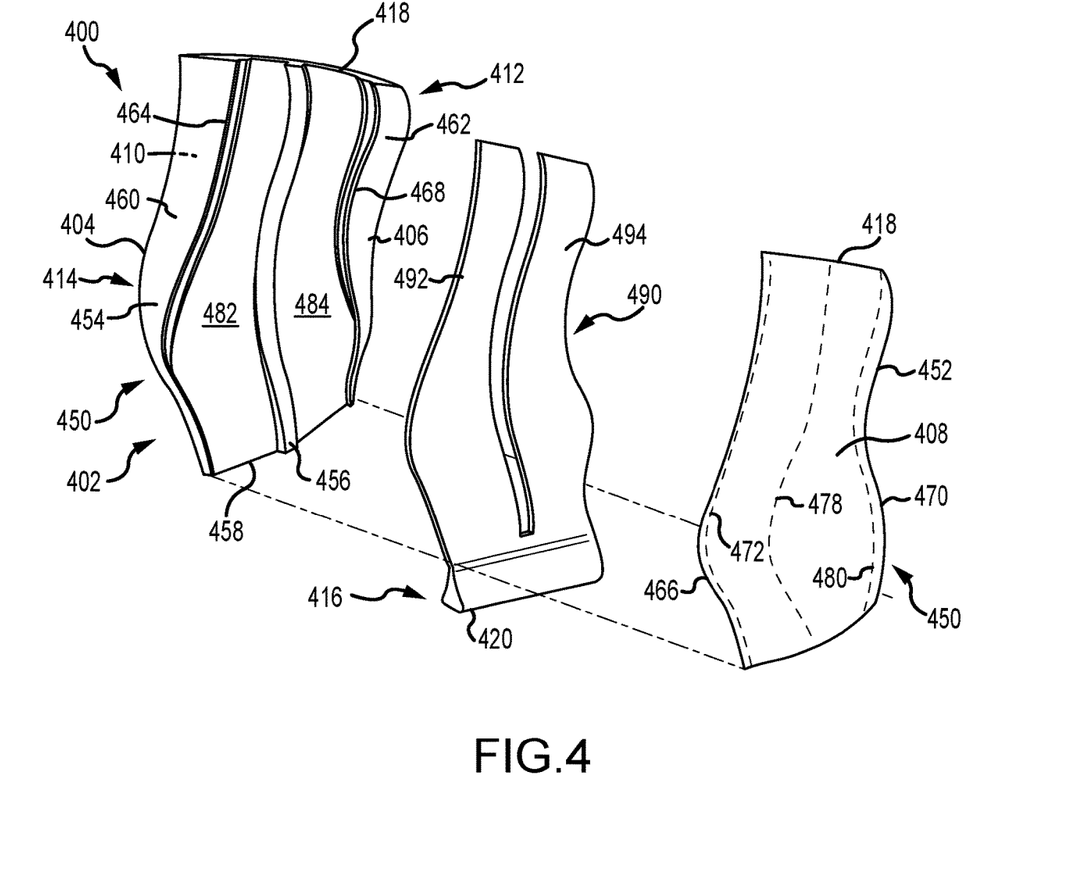
FIG. 4 is a schematic view of a fan blade, in accordance with various embodiments.

Referring now to FIG. 4, a fan blade 400, such as, for example, the fan blade 200 described above with reference to FIG. 2, is illustrated in exploded form. Similar to the foregoing description, the fan blade 400 includes, when assembled, an airfoil 402, having a leading edge 404, a trailing edge 406, a suction side 408 that is a generally convex surface, a pressure side 410 that is a generally concave surface, a tip region 412, an intermediate region 414 and a root region 416. In various embodiments, the tip region 412 includes a tip 418 and the root region 416 includes a root 420. In various embodiments, the fan blade 400 includes a sheath 450 that surrounds a core or interior section of the fan blade 400. In various embodiments, the sheath 450 includes a suction side sheath 452 and a pressure side sheath 454. Further, as described above and below, in various embodiments, when assembled, the sheath 450 forms a continuous sheath that wraps around a core or interior section of the fan blade 400.

In various embodiments, the pressure side sheath 454 includes a central rib 456 that extends spanwise from a base 458 to the tip 418 of the pressure side sheath 454. In various embodiments, the pressure side sheath 454 further includes a leading edge portion 460 and a trailing edge portion 462 that extend spanwise from the base 458 to the tip 418 of the pressure side sheath 454. In various embodiments, the leading edge portion 460 includes a first pressure side sheath edge 464 that is configured to mate with or engage a first suction side sheath edge 466. Similarly, in various embodiments, the trailing edge portion 462 includes a second pressure side sheath edge 468 that is configured to mate with or engage a second suction side sheath edge 470. In various embodiments, the contour of the first pressure side sheath edge 464 is precisely matched with the contour of first suction side sheath edge 466 and the contour of the second pressure side sheath edge 468 is precisely matched with the contour of second suction side sheath edge 470.

As described above with reference to FIG. 3E, when the suction side sheath 452 is positioned against the pressure side sheath 454, one or more cavities are formed between the two sheaths, such as, for example, the first cavity 382 and the second cavity 384 described above with reference to FIG. 3E. Referring again to FIG. 4, a first cavity 482 is formed between the central rib 456 and the leading edge portion 460 and a second cavity 484 is formed between the central rib 456 and the trailing edge portion 462. In various embodiments, a structural core 490 is positioned between the suction side sheath 452 and the pressure side sheath 454, the combination of which forms the fan blade 400. In various embodiments, for example, the structural core 490 may comprise a first core member 492 configured for positioning within the first cavity 482 and a second core member 494 configured for positioning within the second cavity 484. In various embodiments, the first core member 492 and the second core member 494 are secured to or formed integral with the root 420. In various embodiments, the root 420 and the first core member 492 and the second core member 494 form a unitary, monolithic component constructed of a carbon fiber composite structure. In various embodiments, the fan blade 400 is finally formed by sandwiching the structural core 490 between the suction side sheath 452 and the pressure side sheath 454 and securing the sheaths together, such as, for example, by welding along a leading edge portion weld 472, a central portion weld 478 and a trailing edge portion weld 480, in a fashion similar to the description provided above with reference to FIGS. 3A-3E.

Figure 5:
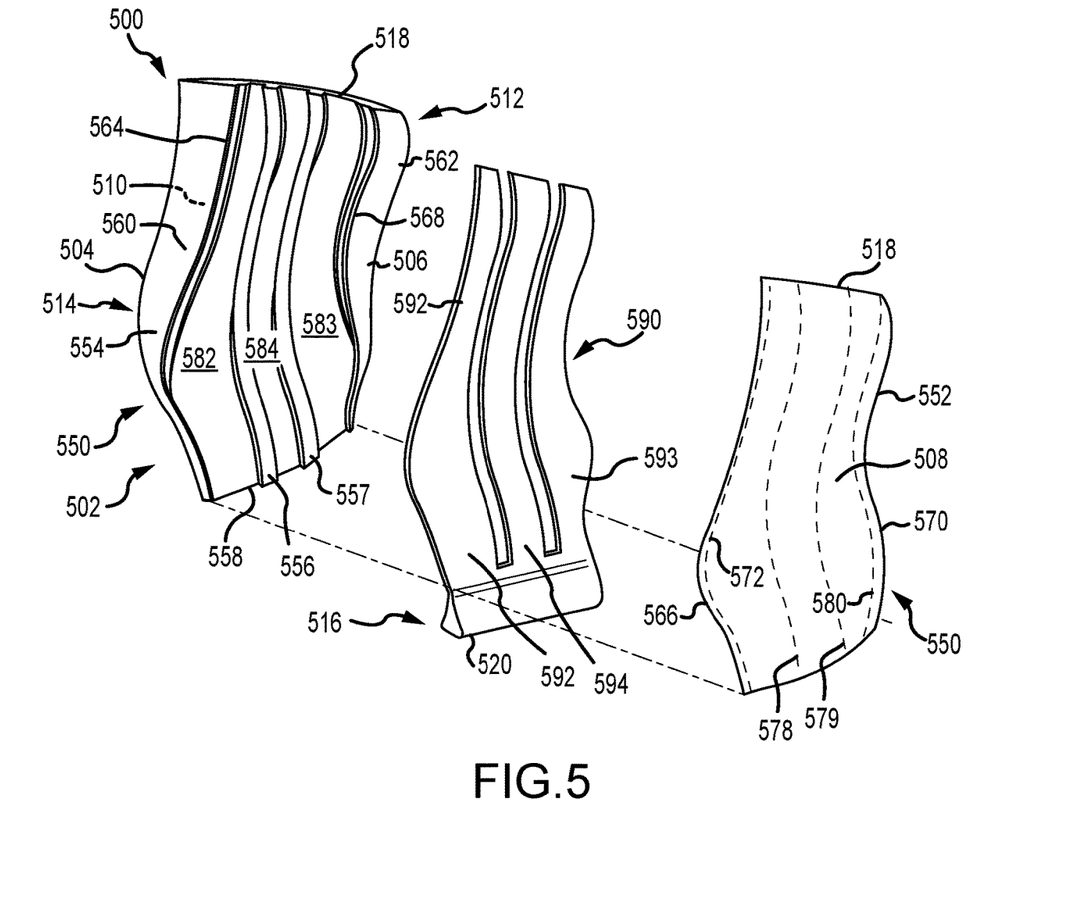
FIG. 5 is a schematic view of a fan blade, in accordance with various embodiments.

Referring now to FIG. 5, a fan blade 500, such as, for example, the fan blade 200 described above with reference to FIG. 2, is illustrated in exploded form. Similar to the foregoing description, the fan blade 500 includes, when assembled, an airfoil 502, having a leading edge 504, a trailing edge 506, a suction side 508 that is a generally convex surface, a pressure side 510 that is a generally concave surface, a tip region 512, an intermediate region 514 and a root region 516. In various embodiments, the tip region 512 includes a tip 518 and the root region 516 includes a root 520. In various embodiments, the fan blade 500 includes a sheath 550 that surrounds a core or interior section of the fan blade 500. In various embodiments, the sheath 550 includes a suction side sheath 552 and a pressure side sheath 554. Further, as described above and below, in various embodiments, when assembled, the sheath 550 forms a continuous sheath that wraps around, generally in the chordwise direction, a core or interior section of the fan blade 500.

In various embodiments, the pressure side sheath 554 includes a first central rib 556 that extends spanwise from a base 558 to the tip 518 of the pressure side sheath 554 and a second central rib 557 that extends spanwise from the base 558 to the tip 518 of the pressure side sheath 554. In various embodiments, the pressure side sheath 554 further includes a leading edge portion 560 and a trailing edge portion 562 that extend spanwise from the base 558 to the tip 518 of the pressure side sheath 554. In various embodiments, the leading edge portion 560 includes a first pressure side sheath edge 564 that is configured to mate with or engage a first suction side sheath edge 566. Similarly, in various embodiments, the trailing edge portion 562 includes a second pressure side sheath edge 568 that is configured to mate with or engage a second suction side sheath edge 570. In various embodiments, the contour of the first pressure side sheath edge 564 is precisely matched with the contour of first suction side sheath edge 566 and the contour of the second pressure side sheath edge 568 is precisely matched with the contour of second suction side sheath edge 570.

As described above with reference to FIG. 3E, when the suction side sheath 552 is positioned against the pressure side sheath 554, one or more cavities are formed between the two sheaths, such as, for example, the first cavity 382 and the second cavity 384 described above with reference to FIG. 3E. Referring again to FIG. 5, a first cavity 582 is formed between the first central rib 556 and the leading edge portion 560, a second cavity 584 is formed between the first central rib 556 and the second central rib 557, and a third cavity 583 is formed between the second central rib 557 and the trailing edge portion 562. In various embodiments, a structural core 590 is positioned between the suction side sheath 552 and the pressure side sheath 554, the combination of which forms the fan blade 500. In various embodiments, for example, the structural core 590 may comprise a first core member 592 configured for positioning within the first cavity 582, a second core member 594 configured for positioning within the second cavity 584 and a third core member 593 configured for positioning within the third cavity 583. In various embodiments, the first core member 592, the second core member 594 and the third core member 593 are secured to or formed integral with the root 520. In various embodiments, the root 520 and the first core member 592, the second core member 594 and the third core member 593 form a unitary, monolithic component constructed of a carbon fiber composite structure. In various embodiments, the fan blade 500 is finally formed by sandwiching the structural core 590 between the suction side sheath 552 and the pressure side sheath 554 and securing the sheaths together, such as, for example, by welding along a leading edge portion weld 572, a first central portion weld 578 and a second central weld portion 579, and a trailing edge portion weld 580, in a fashion similar to the description provided above with reference to FIGS. 3A-3E.

Figure 6:
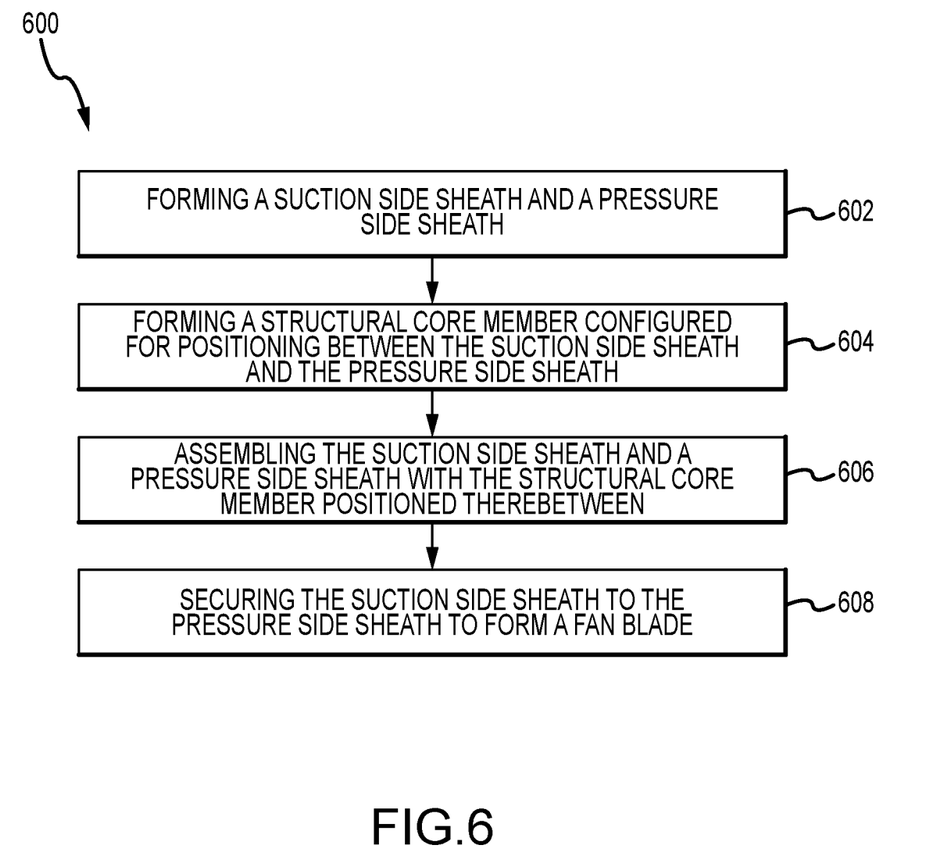
FIG. 6 provides various steps of a method used to manufacture and assemble a fan blade, in accordance with various embodiments.

Referring now to FIG. 6, a method 600 comprising various steps to form a fan blade, such as, for example, the fan blade 400 described above with reference to FIG. 4, is provided. In various embodiments, the method 600 includes the step of forming a suction side sheath and a pressure side sheath (Step 602). In various embodiments, the suction side sheath and the pressure side sheath are formed of titanium or an alloy of titanium, stainless steel, nickel or other metals or alloys and are configured similar to the suction side sheaths and the pressure side sheaths described above. In various embodiments, the method 600 includes the step of forming a structural core configured for positioning between the suction side sheath and the pressure side sheath (Step 604). In various embodiments, the structural core is formed of a carbon fiber composite matrix and is configured similar to the structural cores described above. In various embodiments, the method 600 includes the step of assembling the suction side sheath and the pressure side sheath with the structural core positioned therebetween (Step 606). In various embodiments, the method 600 includes the step of securing the suction side sheath to the pressure side sheath to form a fan blade (Step 608). In various embodiments, the step of securing the suction side sheath to the pressure side sheath may be accomplished using one or more of the techniques described above, such as, for example, welding the components together along a leading edge weld, one or more central portion welds (or zero central portions welds for embodiments having no central rib) and a trailing edge portion weld. In various embodiments, the securing of the components may also be accomplished by one or more of welding, laser welding, brazing, soldering and riveting.

While the foregoing description is presented primarily in terms of fan blades for a gas turbine engine, it will be appreciated that fan and compressor blades are subject to similar design considerations. Accordingly, the principles and concepts described above should be considered to apply not just to fan blades, but to compressor blades as well. Further, turbine blades also share various of the characteristics and requirements applied to fan and compressor blades, including the need for strong and durable impact-resistant designs. Accordingly, the principles and concepts described above should be considered to apply to turbine blades as well. Further, it will be appreciated that the structure and features described above for the pressure side sheaths and the suction side sheaths may be reversed, such that, for example, a suction side sheath may, in accordance with various embodiments, include the structure above described for the pressure side sheaths and a pressure side sheath may, in accordance with various embodiments, include the structure above described for the suction side sheaths.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for forming a blade for use with a gas turbine engine, comprising:
    forming a suction side sheath and a pressure side sheath, wherein the suction side sheath and the pressure side sheath are configured to form a continuous sheath that wraps around an interior section of the blade, and wherein at least one of the pressure and suction side sheaths includes a base, a tip and a rib extending spanwise between the base and the tip such that a first cavity and a second cavity are established on opposed sides of the rib;
    forming a structural core configured for positioning in the interior section between the suction side sheath and the pressure side sheath, wherein the structural core includes a first core member, a second core member and a root interconnecting the first and second core members;
    assembling the suction side sheath and the pressure side sheath with the structural core positioned there between such that the first core member is positioned in the first cavity and the second core member is positioned in the second cavity; and securing the suction side sheath to the pressure side sheath to form the blade.

2. The method as recited in claim 1, wherein the blade is a fan blade.

3. The method as recited in claim 2, wherein the pressure and suction side sheaths are metallic, and wherein the step of forming the structural core occurs such that the root, the first core member and the second core member form a unitary, monolithic component constructed of a carbon fiber composite structure.

4. The method as recited in claim 1, wherein the pressure and suction side sheaths cooperate to establish a leading edge and a trailing edge of the blade, and wherein the securing step includes welding the suction side sheath to the pressure side sheath along at least one of a leading edge portion weld adjacent the leading edge, a central portion weld adjacent the rib and a trailing edge portion weld adjacent the trailing edge.

5. The method as recited in claim 4, wherein the root is configured for attachment to a rotor.

6. The method as recited in claim 5, wherein the blade is a fan blade.

7. The method as recited in claim 1, wherein the pressure side sheath includes a leading edge portion and a trailing edge portion, and wherein the assembling step occurs such that the suction side sheath mates against the leading edge portion and the trailing edge portion.

8. The method as recited in claim 7, wherein the leading edge portion includes a first pressure side sheath edge, and the trailing edge portion includes a second pressure side sheath edge.

9. The method as recited in claim 8, wherein the suction side sheath includes a first suction side sheath edge that mates with the first pressure side sheath edge and a second suction side sheath edge that mates with the second pressure side sheath edge.

10. The method as recited in claim 9, wherein the first suction side sheath edge extends from a suction side base of the suction side sheath to a suction side tip of the suction side sheath, and the first pressure side sheath edge extends from a pressure side base of the pressure side sheath to a pressure side tip of the pressure side sheath.

11. The method as recited in claim 10, wherein the second suction side sheath edge extends from the suction side base of the suction side sheath to the suction side tip of the suction side sheath, and wherein the second pressure side sheath edge extends from the pressure side base of the pressure side sheath to the pressure side tip of the pressure side sheath.

12. The method as recited in claim 1, wherein the pressure side sheath includes a leading edge portion and a trailing edge portion, the first cavity is established between the leading edge portion and the rib, and the second cavity is established between the trailing edge portion and the rib.

13. The method as recited in claim 12, wherein the root is configured for attachment to a rotor hub or a rotor disk.

14. The method as recited in claim 13, wherein the blade is a fan blade.

15. The method as recited in claim 14, wherein the structural core comprises a carbon based composite material.

16. The method as recited in claim 15, wherein the suction side sheath and the pressure side sheath are formed of a metal or metal alloy.

17. The method as recited in claim 16, wherein the step of forming the structural core occurs such that the root, the first core member and the second core member form a unitary, monolithic component constructed of a carbon fiber composite structure.

18. The method as recited in claim 17, wherein the suction side sheath and the pressure side sheath comprise titanium, stainless steel or nickel.

19. The method as recited in claim 17, wherein the root includes circumferential faces that slope outwardly from the first and second core members to establish an external surface contour of the blade.

20. The method as recited in claim 19, wherein the at least one of the pressure and suction side sheaths is the pressure side sheath, the assembling step occurs such that the rib abuts an interior surface of the suction side sheath along an interface from the base to the tip, and the securing step includes fixedly attaching the rib and the interior surface of the suction side sheath along the interface.

* * * * *